United States Patent
Miya et al.

(10) Patent No.: US 7,159,296 B2
(45) Date of Patent: Jan. 9, 2007

(54) COIL-WINDING MACHINE STATOR INSTALLATION JIG

(75) Inventors: Taiichi Miya, Tokyo (JP); Naohiko Aoyama, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 384 days.

(21) Appl. No.: 10/623,760

(22) Filed: Jul. 21, 2003

(65) Prior Publication Data

US 2004/0055148 A1    Mar. 25, 2004

(30) Foreign Application Priority Data

Jul. 25, 2002    (JP)    ............................... 2002-216317

(51) Int. Cl.
*H02K 15/02*    (2006.01)
*H02K 15/10*    (2006.01)

(52) U.S. Cl. .......................... 29/598; 29/566.1; 29/596; 29/597; 29/732; 29/735; 29/736; 242/432.6; 310/71; 310/90; 310/216

(58) Field of Classification Search ................. 29/598, 29/566.1, 596, 597, 732, 735, 736; 242/432.6; 310/71, 90, 216

See application file for complete search history.

(56) References Cited

U.S. PATENT DOCUMENTS

| | | | |
|---|---|---|---|
| 2,304,520 A | 12/1942 | Wirtz et al. | |
| 4,739,807 A | 4/1988 | Walker | |
| 5,535,503 A | 7/1996 | Newman | |
| 5,760,505 A | 6/1998 | Farou et al. | |
| 6,031,307 A | 2/2000 | Ohshita | |

OTHER PUBLICATIONS

European Search Report, Nov. 12, 2003.

*Primary Examiner*—A. Dexter Tugbang
*Assistant Examiner*—Tim Phan
(74) *Attorney, Agent, or Firm*—Joel E. Lutzker, Esq.; John C. Garces, Esq.; Schulte Roth & Zabel LLP

(57) ABSTRACT

A stator stack and stator jig assembly provide a consistent amount of slack in stator coil wires without increasing the complexity of coil-winding machines or adding production steps, and prevent crossing of the stator coil wires in the slack areas. A stator stack having magnetic pole teeth is mounted in a stator installation jig, and the ends of slack forming plates having grooves are made to project above the top surface of the stator stack to thrust stator coil wires upwardly. The coil-winding machine winds stator coil wires around the magnetic pole teeth, and after the stator coil wires are wound, the ends of the stator coil wires are passed through grooves in the ends of the plates to output pins. The coil-winding machine wraps the ends of the stator coil wires around the output pins. On removing the stator from the stator installation jig, the parts of the stator coil wires which where thrust upward become slack areas.

5 Claims, 3 Drawing Sheets

PRIOR ART

COIL-WINDING MACHINE STATOR INSTALLATION JIG

CROSS-REFERENCE TO RELATED APPLICATIONS

This application claims priority from Japanese Patent Application No. 2002-216317 filed on Jul. 25, 2002.

FIELD OF THE INVENTION

This invention relates to stator installation jigs for coil winding machines and to coil-winding methods for forming slack in stator coil wires in resolvers, motors, and other rotary electrical equipment. More particularly, the inventions relate to solving the problem of the crossing of stator coil wires.

BACKGROUND OF THE INVENTION

FIG. 5 shows a partial view of a stator 1 coupled to a coil-winding machine. The coil-winding machine is provided with a rod 7, which is disposed between the connector part 4 of the stator 1 and the inner periphery. As shown, the stator coil wires 6 are wound around the magnetic pole teeth 2 and also the stator coil wires 6 are wrapped onto the output pins 5 after they are carried over the rod 7. The rod 7 is pulled out from under the stator coil wires 6 after the wires are wound onto the stator 1, so that slack is created in the stator coil wires 6, thus preventing stator coil wire 6 breakage due to temperature variations, etc.

Another technique for forming slack in the stator coil wires 6 is shown in FIG. 6. Here, detour pins 8 are fixed near the output pins 5, and the stator coil wires 6 are caused to detour around the outside of the detour pins 8 in between the magnetic pole teeth 2 and the output pins 5. In this technique, slack is created in the stator coil wires 6 since the detour pins 8 are removed after coil-winding of the stator 1 is complete, thus preventing stator coil wire 6 breakage due to temperature variations, etc.

However, a shortcoming in the prior art technique shown in FIG. 5 is that a mechanism is required in the coil-winding machine to drive the rod 7, thereby making the construction of the coil-winding machine complex. Moreover, it is difficult to obtain consistent operation of the rod 7 in the coil-winding machine, thus making it difficult to obtain a consistent amount of slack.

A shortcoming of the technique shown in FIG. 6 is that it requires the insertion and removal of the detour pins 8 in the stator 1. There are also limitations on the position of the installation of the detour pins 8, and a sufficient amount of slack cannot be created. Thus, it may not be possible for the slack to fulfill its role of preventing wire breakage due to temperature variations.

Moreover, in the prior art techniques described above, as the number of output pins 5 increases, the slack portions of the stator coil wires 6 are apt to cross over one another. Vibration and other factors can cause these stator coil wires 6 to rub against one another, damaging their coating. This can result in such serious failures as shorts and broken wires.

SUMMARY OF THE INVENTION

Therefore, an object of the present invention is to provide a coil-winding machine stator installation jig and a stator coil-winding method that prevent the crossing of stator coil wires in the slack areas, while providing a consistent amount of slack in the coil wires, without making the coil-winding machine more complex or increasing the number of production steps.

Accordingly, a stator jig attachment for a coil winding machine is provided adapted to support a ring-shaped stator provided with a plurality of magnetic pole protuberances on an inner periphery and having a connector with a plurality of connector parts on an outer periphery wherein stator coil wires are wound onto the magnetic pole protuberances and the plurality of connector parts by means of the coil-winding machine, the stator installation jig comprising at least one projecting member that penetrates through a gap that is formed between the connector and the outer periphery of the stator when the stator is supported by the stator installation jig, the at least one projecting member forming a plurality of grooves such that the stator coil wires which are strung between the connector parts and the plurality of magnetic pole protuberances are carried over the projecting member and between the plurality of grooves thereby imparting slack to the stator coil wires while preventing the stator coil wires from crossing.

The plurality of grooves formed by the at least one projecting member are substantially parallel. Preferably, no more than two stator coil wires are permitted to pass through a single groove. However, if two stator coil wires are passed through a single groove, each stator coil wire is passed through against the farthest ends of the groove so that enough distance separating the two wires is guaranteed. Also, the stator coil wire is fixed with varnish applied to the inner periphery of the stator when the stator coil wire winding operation is complete. In this case, when the varnish is applied while the stator installation jig is supporting the stator, any crossing of the stator coil wires is prevented because the distance between the stator coil wires is held fixedly by the stator installation jig.

In another aspect of the present invention, in a stator installation jig for a coil winding machine, having a slack forming plate including a plurality of grooves, and adapted to support a stator provided with a plurality of magnetic pole teeth and having a connector with a plurality of connectors on an outer periphery of the stator and a gap formed between the connector and stator, a method is provided of winding coils on the stator and the connector comprising the steps of supporting the stator on the installation jig such that the slack forming plate extends through the gap in the stator, winding coils on the plurality of magnetic pole teeth and connecting terminal end portions of the coils to the connector such that at least one coil extends over and within each of the plurality of grooves formed in the slack forming plate to separate and create slack in the coil wires.

Accordingly, in the present invention, there is no need to make the coil-winding machine more complex, as in the above-described prior art technology, or to increase the number of production steps, since the stator is supported by the stator installation jig and there is a projecting part or slack forming member, which projects through a gap formed between the stator and a connector part, and which provides the stator coil wires with slack. Moreover, since there is almost no variation in the amount of projection of the stator projecting parts, stator coil wire winding is stabilized, and a consistent amount of slack can be created. Also, when the stator coil wires are strung between the connector parts and magnetic pole protuberances, coil-winding can be effected without any crossing of the stator coil wires because the stator coil wires go over and through the grooves formed in the projecting parts, which are preferably divided according to the pitch of the stator coil wires.

Further features and advantages of the invention will become evident to one skilled in the art upon reading of the detailed description of the invention, which is given below by way of example only and with reference to the accompanying drawings, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION

Figure 1:
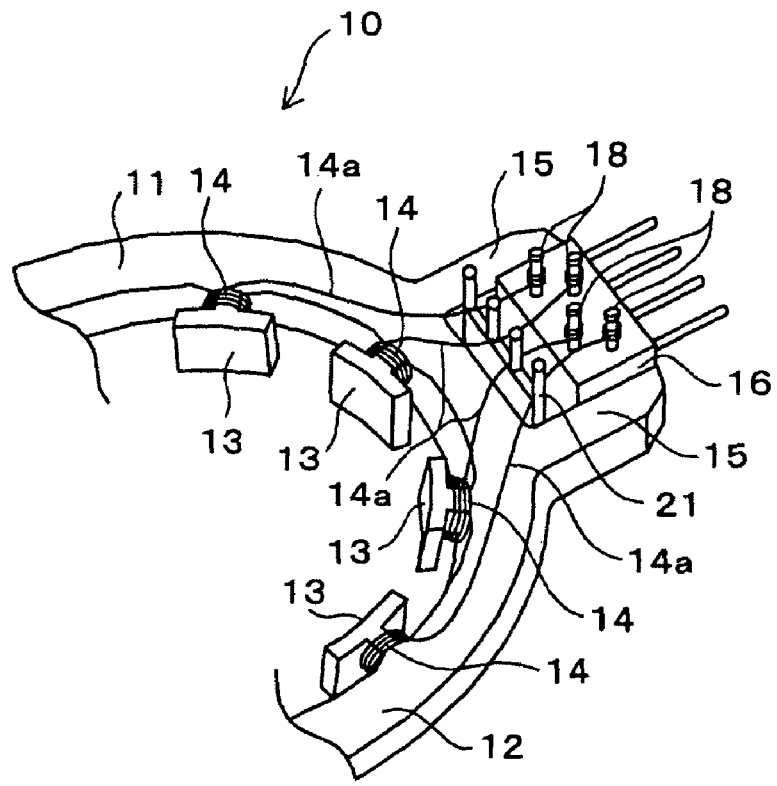
FIG. 1 is a perspective view of a portion of a VR resolver and stator installation jig using an embodiment of this invention.

The following description of an embodiment of the present invention is made with reference to FIGS. 1–4. In these drawings, reference number 10 is a VR resolver (variable reluctance resolver), which comprises a stator 11 and a rotor (not shown) disposed inside the stator 11. Reference number 12 in the drawings is the stator stack (stator), and the stator stack 12 comprises alternating layers of thin sheets of magnetic material and insulating material, which is entirely covered in an insulating cover. Reference number 13 in the drawings are the magnetic pole teeth (magnetic protuberances), which are a portion of the stator stack 12. The magnetic teeth 13 project in toward the center of stator stack 12, creating a gap between the neck area 13a and rotor, forming an approximately arcuate part 13b, and the stator coil wires 14 are wound onto the neck area 13a.

Arms 15 are formed so that they project toward the outer periphery on the stator stack 12, and connector parts 16 are fixed in the gaps 17 between arms 15. A plurality of L-shaped output pins (connection parts) 18 are implanted in the connector parts 16. The top ends of the output pins 18 project above the surface of the connector part 16, and the stator coil wires 14 are wrapped onto the top ends of the output pins 18, and are fixed in place by welding or other method. The other ends of the output pins 18 project out from the back of the connector parts 16, and are connected by means of a socket or directly to external wiring.

Figure 2:
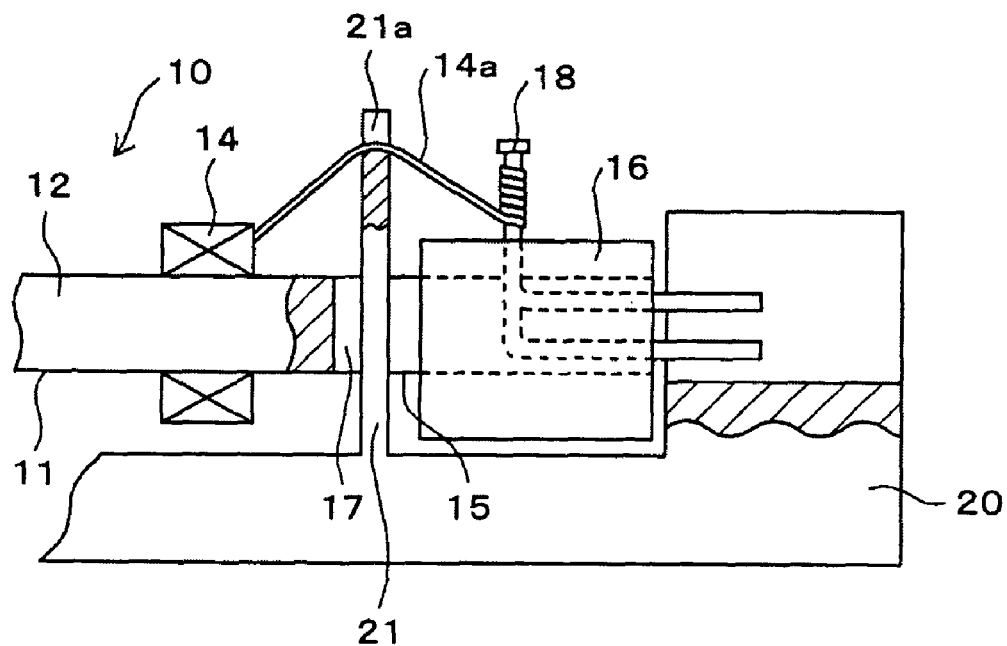
FIG. 2 is a cross section view of a portion of a VR resolver and stator installation jig using an embodiment of this invention.
Figure 3:
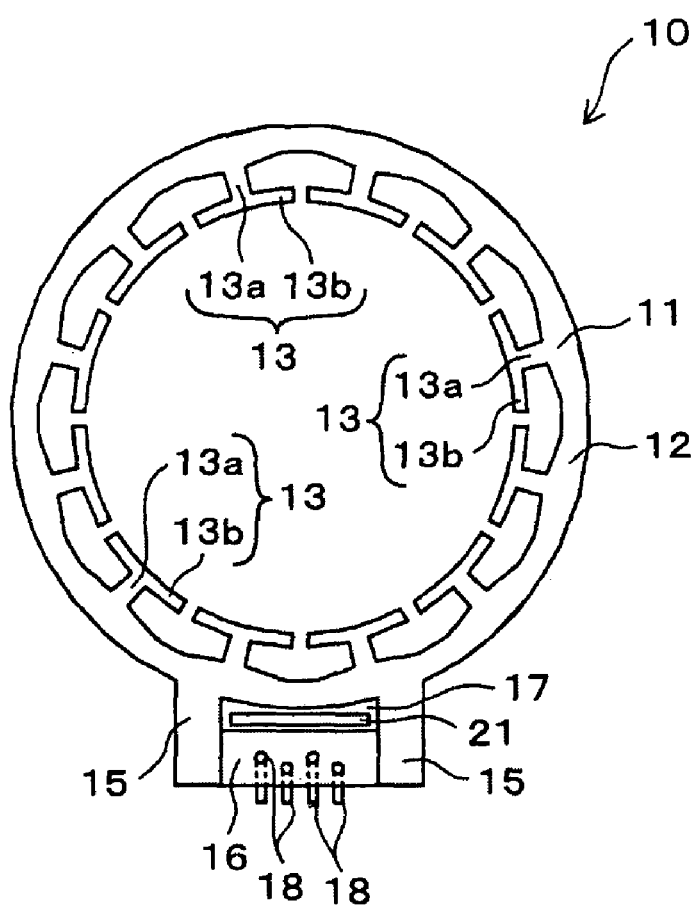
FIG. 3 is a plan view of a portion of a VR resolver and stator installation jig using an embodiment of this invention.

In FIG. 2, reference number 20 is the stator installation jig. The stator stack 12 is configured so that when mounted on the stator installation jig 20, the correct location of the stator stack 12 is found. Also, the stator installation jig 20 has plates (projecting parts) 21 which project facing upward, and the top ends of the plates 21 are configured with a plurality of grooves (of which there are three in this preferred embodiment) 21a. As explained below, the three grooves are adapted to receive four stator coil wires 14 in a preferred embodiment: each of the two outer grooves support a single coil wire and the middle groove (between the two outer grooves) supports two wires.

When the stator stack 12 is installed in the stator installation jig 20, the plates 21 pass through the gap 17 and project above the stator stack 12. At this time, the dimensions of the bottoms of the grooves 21a are such that they are positioned higher than the direct path from the magnetic pole teeth 13 to the output pins 18 to impart slack to stator coil wires to be wrapped around output pins 18.

The following is a description of the procedure used for winding the coil wires on the above-described stator stack 12. First, the stator stack 12 is mounted on the stator installation jig 20, and the top ends of the plates 21 are made to project through gaps 17 above the top surface of the plate stack 12. In this condition, the stator installation jig 20 and the stator stack are inserted into the coil-winding machine. The coil-winding machine winds the stator coil wire 14 on the prescribed magnetic pole teeth 13, and after coil-winding is complete, the ends 14a of the stator coil wires 14 are passed through the grooves 21a in the plates 21 to the output pins 18.

Next, the coil-winding machine wraps the ends 14a of the stator coil wires 14 around the output pins 18, and welds them there. By repeating this operation, the ends 14a of the stator coil wires are wrapped around all of the output pins 18. Also, having done so, there will be one stator coil wire 14 passing through the grooves 21a on both ends, and 2 stator coil wires 14 passing through the middle groove 21a.

Since the winding and wrapping operations are performed while the stator coil wires 14 are under tension, the stator coil wires 14 are pressed into the bottoms of the grooves 21a. Stated differently, the stator coil wires 14 are pushed upward by the bottoms of the grooves 21a, forming a hump-shape from the magnetic pole teeth 12, over the grooves 21a, to the output pins 18 as shown in FIG. 2. Therefore, when the stator 11 is removed from the stator installation jig 20 after the coil-winding operation is complete, there will be a slack area where the stator coil wires 14 have been thrust upwardly. After winding is complete, varnish is applied to the inner periphery of the stator stack 12 in order to coat the stator coil wires. The varnish is applied so that it comes as far as the vicinity of the gap 17 in the stator stack 12, fixing the ends 14a of the stator coil wire 14 which extends in that interval.

In the above embodiment, there is no need to make the coil-winding machine more complicated or to add production steps since the stator stack 12 is supported by the stator installation jig 20, the plates 21 project above the top of the stator stack 12, and the stator coil wires 14 are given slack by the grooves 21a in these plates 21. Further, since there is virtually no variation in the projection height of the bottoms of the grooves 21a in the plates 21, and the stator coil wires are thrust up by the bottoms of the grooves 21a, a consistent amount of slack can be imparted to the stator coil wires. Moreover, the stator coil wires 14 can be wound by the coil-winding machine without crossing one another because the stator coil wires 14 running to the output pins 18 are separated by the grooves 21a. Thus, there is no wear of the ends 14a of the stator coil wire 14 due to vibration, and problems such as shorts and broken wire can be prevented.

In the above embodiment, since four stator coil wires 14 are passed through three grooves 21a, there are two stator coil wires 14 passing through the center groove 21a. If the two stator coil wires 14 are in contact with each other, there is a possibility that they can cross one another when the stator 11 is removed from the stator installation jig 20 and the stator coil wires 14 are given slack. Therefore, in the above embodiment, the two stator coil wires 14 pass through both ends of the groove 21a. Also, the distance between adjoining stator coil wires 14 is maintained by passing the stator coil wires 14 so that their positions are determined by the end of the plate 21 at the two sides of the groove 21a. The position of these stator coil wires 14 in the groove 21a is determined by the relative position of the output pins 18 to the groove 21a. Thus, the position of the grooves 21a is designed such that each stator coil wire 14 is disposed as above in the grooves 21a.

It is preferable that there be two or fewer stator coil wires passing through each of the groove parts of the projecting parts. If there are two stator coil wires passing through a groove part, it is preferable that each coil wire passes through against the farthest ends of the groove part so that enough distance separating the two coil wires is guaranteed. Also, the stator coil wire is fixed with varnish applied to the inner periphery of the stator when the stator coil wire winding operation is complete. In this case, when the varnish is applied while the stator installation jig is supporting the stator, any crossing of the stator coil wires is prevented because the distance between the stator coil wires is held fixedly by the stator installation jig.

Figure 4A:
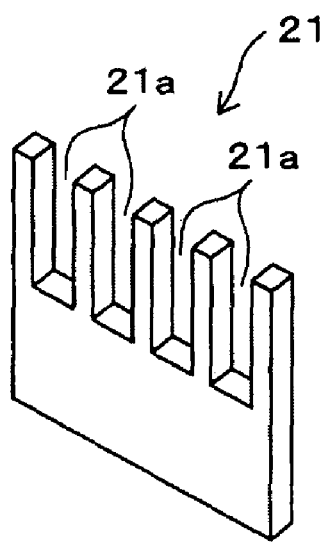
FIGS. 4A and 4B are perspective views of variants of a plate of a stator installation jig of an embodiment of the invention.

The present invention is not limited to the above-described embodiments, and a number of variations, as described below, are possible. FIG. 4A is a variant example in which the plate 21 has four grooves 21a relative to four output pins 18. In this mode of the invention, since a single strand of stator coil wire 14 can pass through a single groove 21a, the width of the grooves can be made smaller, and the spacing between the stator coil wires 14 can be maintained without regard to the positional relationship between the output pins 18 and the grooves 21a. An example of a preferred mode would a Y-shaped groove 21a, which makes it easier to insert the stator coil wires 14 in the grooves 21a.

Figure 4B:
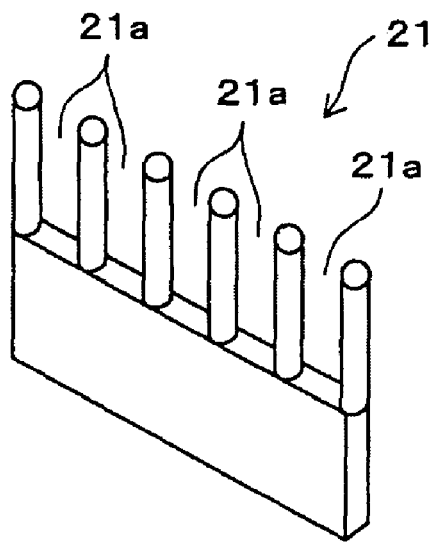
Figure 5:
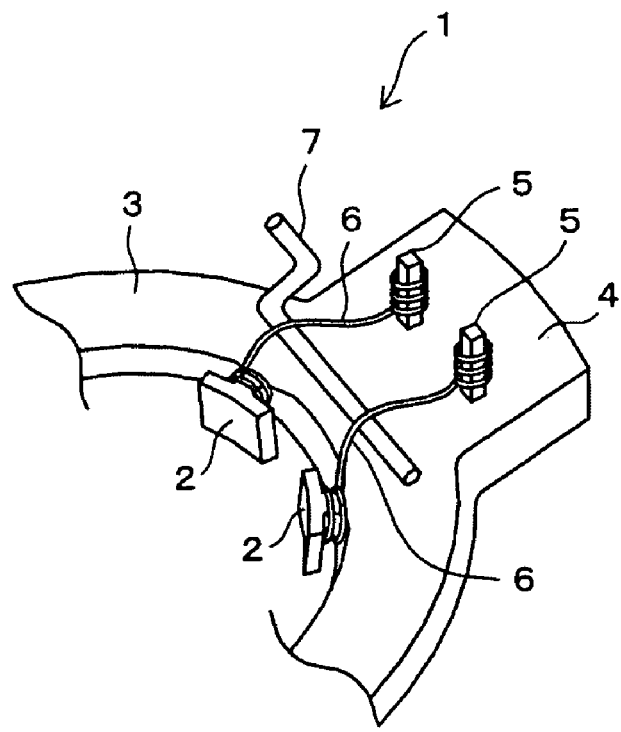
FIG. 5 is a perspective view of a prior art technique for producing slack in stator coil wire.
Figure 6:
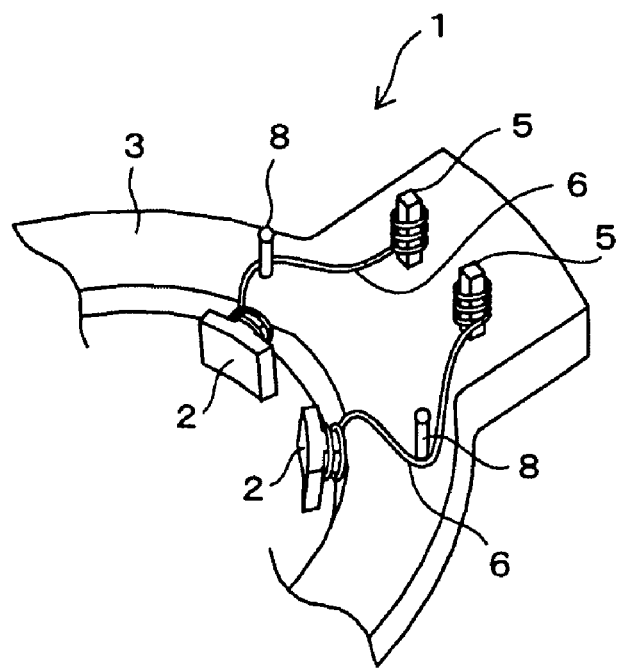
FIG. 6 is a perspective view of another prior art technique for producing slack in stator coil wire.

FIG. 4B is a variant in which the grooves 21 a are configured with round rods on both sides. The advantage of this variation is that it makes it unlikely that the coating on the stator coil wires 14 would be damaged when the stator coil wires 14 rub on these round rods.

Although the above embodiments are configured with multiple grooves 21a in a single plate 21, a plurality of plates, each of which is provided with a single groove, is also possible such as, for example, in a staggered configuration. Also, by applying the varnish while the stator stack 12 is supported in the stator installation jig 20, crossing of the stator coil wires 14 can be effectively prevented because the spacing of the stator coil wires 14 is fixed.

By creating a gap between the stator contacting parts and the inner periphery, when the stator installation jig supports the stator, and a projecting part is provided which has a plurality of groove parts which penetrate this gap and project above one surface, and the stator coil wires are adjusted between the connecting parts and the magnetic pole protuberances, the invention described above has the effect of providing a consistent amount of slack in the stator coil wires because the stator coil wires are separated from one another and are carried over. This is done without having to make the coil-winding machine more complex or add production steps. The invention also has the effect of preventing crossing of the stator coil wires in the slack areas.

While particular embodiments of the present invention have been described, it will be apparent to those skilled in the art that changes and modifications may be made without departing from this invention in its broader aspect and, therefore, the appended claims are to encompass within their scope all such changes and modifications that fall within the true sprit and scope of this invention.

What is claimed is:

1. A stator installation jig for a coil-winding machine adapted to support a ring-shaped stator provided with a plurality of magnetic pole protuberances on an inner periphery of the stator and having a connector with a plurality of connector parts on an outer periphery wherein stator coil wires are wound onto the magnetic pole protuberances and the plurality of connector parts by means of the coil-winding machine, the stator installation jig comprising a plurality of projecting members penetrating through a single elongated gap that is formed between the connector and the outer periphery of the stator and projecting above the ring-shaped stator when the stator is supported by the stator installation jig, the plurality of projecting members forming a plurality of grooves such that the stator coil wires which are strung between the connector parts and the plurality of magnetic pole protuberances are carried over the projecting members and between the plurality of grooves thereby imparting slack to the stator coil wires while preventing the stator coil wires from crossing.

2. The stator installation jig according to claim 1 wherein the plurality of grooves are substantially parallel.

3. The stator installation jig according to claim 2 wherein no more than two coils are permitted to pass through a single groove.

4. The stator installation jig according to claim 2 wherein each of the plurality of grooves extends between substantially rounded wall portions formed in the projecting members.

5. The stator installation jig according to claim 2 wherein each of the plurality of grooves extends between substantially rectangular wall portions formed in the projecting members.

* * * * *